United States Patent
Yoo (12) United States Patent (10) Patent No.: US 6,819,074 B2
Yoo (45) Date of Patent: Nov. 16, 2004

(54) APPARATUS AND METHOD OF CONTROLLING A DRIVING SPEED OF A MOTOR

(75) Inventor: Ho-Sun Yoo, Seongnam (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 10/331,919

(22) Filed: Dec. 31, 2002

(65) Prior Publication Data

US 2004/0036432 A1 Feb. 26, 2004

(30) Foreign Application Priority Data

Aug. 22, 2002 (KR) ........................................ 2002-49902

(51) Int. Cl.[7] .............................................. G05B 19/29
(52) U.S. Cl. ........................ 318/602; 318/603; 318/600; 318/461; 318/799; 388/904; 388/907.5; 388/912
(58) Field of Search ................................ 318/600, 602, 318/603, 461, 798–799; 388/800–809, 904, 907.5, 912

(56) References Cited

U.S. PATENT DOCUMENTS

| 4,083,052 A | * | 4/1978 | Metcalf ........................ 346/18 |
| 4,680,518 A | * | 7/1987 | Kurakake et al. ........... 318/561 |
| 5,083,072 A |   | 1/1992 | Song |
| 5,325,460 A | * | 6/1994 | Yamada et al. ............. 388/811 |
| 5,384,526 A | * | 1/1995 | Bennett ..................... 318/610 |
| 6,008,617 A | * | 12/1999 | Kaneko et al. ............. 318/807 |

* cited by examiner

Primary Examiner—Rina Duda
(74) Attorney, Agent, or Firm—Staas & Halsey LLP (57) ABSTRACT

An apparatus for controlling a driving speed of a motor comprises a motor controller provided in the motor controlling apparatus detecting the motor driving speed in response to pulses outputted from an encoder. The motor controller adjusts a detection period for the pulses according to the motor driving speed, thereby measuring the motor driving speed. The motor controller sets the detection period so that a number of four-multiplied pulses can be a multiple of four. Although a phase difference between pulses outputted from an encoder is not constant, the motor controlling apparatus can obtain a desired response characteristic by excluding effects of a phase error between the pulses.

29 Claims, 7 Drawing Sheets

APPARATUS AND METHOD OF CONTROLLING A DRIVING SPEED OF A MOTOR

CROSS-REFERENCE TO RELATED APPLICATION

This application claims the benefit of Korean Patent Application No. 2002-49902 filed on Aug. 22, 2002, in the Korean Intellectual Property Office, the disclosure of which is incorporated herein by reference.

BACKGROUND OF THE INVENTION

1. Field of the Invention

The present invention relates to an apparatus for controlling a driving speed of a motor using pulses outputted from an encoder.

2. Description of the Related Art

An encoder is provided in a motor to detect a driving speed thereof. The encoder senses light passing through a plurality of slots formed in a circular disk, which is rotated along with an axis of the motor and then outputs pulses corresponding to the light sensed. A motor controller can detect the driving speed of the motor by counting the pulses outputted from the encoder.

Three methods of measuring the driving speed of the motor using the pulses outputted from the encoder exist. The three measurement methods include an M-type measurement method, a T-type measurement method and an M/T-type measurement method. In the M-type measurement method, the driving speed of the motor is measured by counting a number of pulses inputted for a constant sampling period. Further, in the T-type measurement method, the driving speed of the motor is measured by measuring a time interval between input pulses using high frequency clocks. Furthermore, in the M/T-type measurement method, the driving speed of the motor is measured by counting the number of pulses inputted for a period of time until a first pulse input is inputted after a sampling period. A problem exists in that the driving speed of the motor in low and high-speed regions cannot be exactly measured in the M-type and T-type measurement methods.

Hereinafter, a detailed description will be given of the M/T-type measurement method.

Figure 1A:
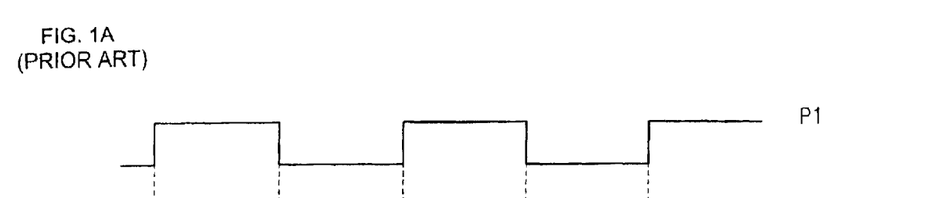
FIGS. 1A and 1B are views showing pulses outputted from an encoder and FIG. 1C is a view showing four-multiplied pulses.
Figure 1B:
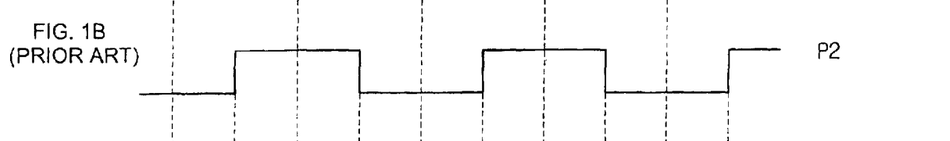
Figure 1C:
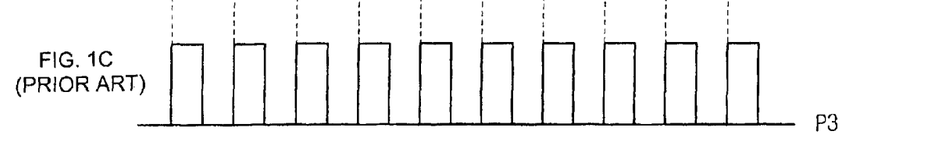

As shown in FIGS. 1A–1C, an encoder outputs two pulse streams P1 and P2 having a phase difference. A phase difference between the first pulse stream P1 and the second pulse stream P2 is 90°. The encoder outputs of the first pulse stream P1 and the second pulse stream P2 are alternated. A motor controller receives two pulses from the encoder and then generates a third pulse stream P3 by multiplying the two pulses by four.

Figure 2A:
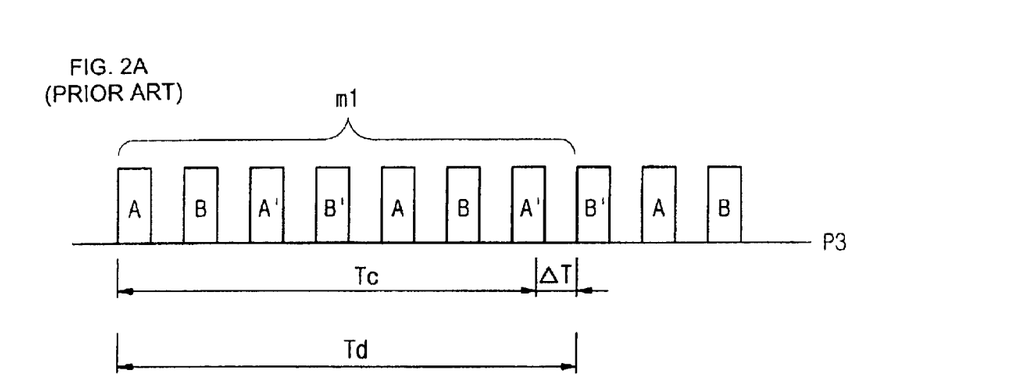
FIGS. 2A and 2B are views explaining a method of detecting a driving speed of a motor according to an M/T measurement method.
Figure 2B:
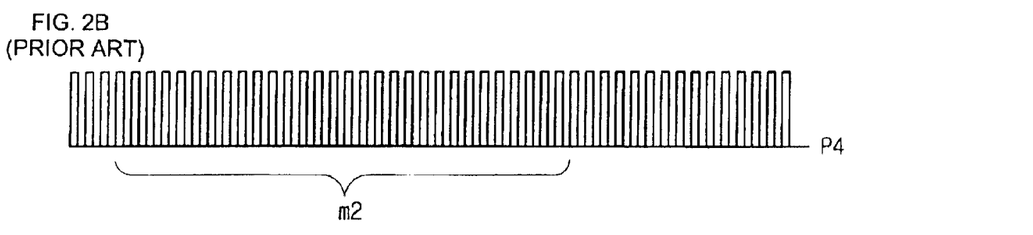

Referring to FIGS. 2A–2B, the motor controller measures the driving speed of a motor using the following Equation 1.

$$\text{Motor driving speed } (Nf) = (60 \cdot fc \cdot m1)/(Pn \cdot m2) \quad \text{Equation 1}$$

In Equation 1, Pn denotes a number of pulses outputted from the encoder per rotation, m1 denotes a number of four-multiplied pulses, fc denotes a predetermined frequency, and m2 denotes a number of pulses of the predetermined frequency fc. The motor driving speed can be measured by substituting the number of four-multiplied pulses for m1 and substituting the number of pulses of the predetermined frequency fc for m2, for a total detection time (Td=Tc+ΔT), after a lapse of a constant sampling time Tc, that is, when the first four-multiplied pulse is inputted.

Because a phase error occurs during manufacture of the encoder, a phase difference between two pulse streams may not be exactly 90° and a duty cycle of a pulse may not be 50%. Accordingly, the motor driving speed cannot be exactly detected. The reason that the motor driving speed cannot be exactly detected will be described in more detail.

Figure 3A:
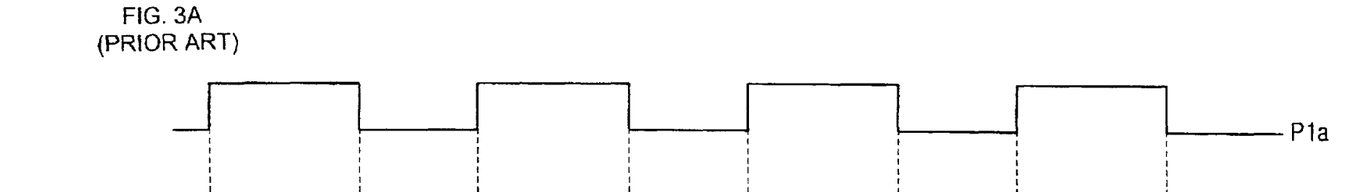
FIGS. 3A–3C are views explaining a conventional operation of detecting a driving speed of a motor using a constant sampling period.
Figure 3B:
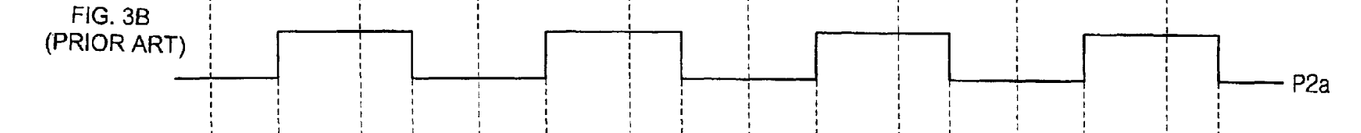
Figure 3C:
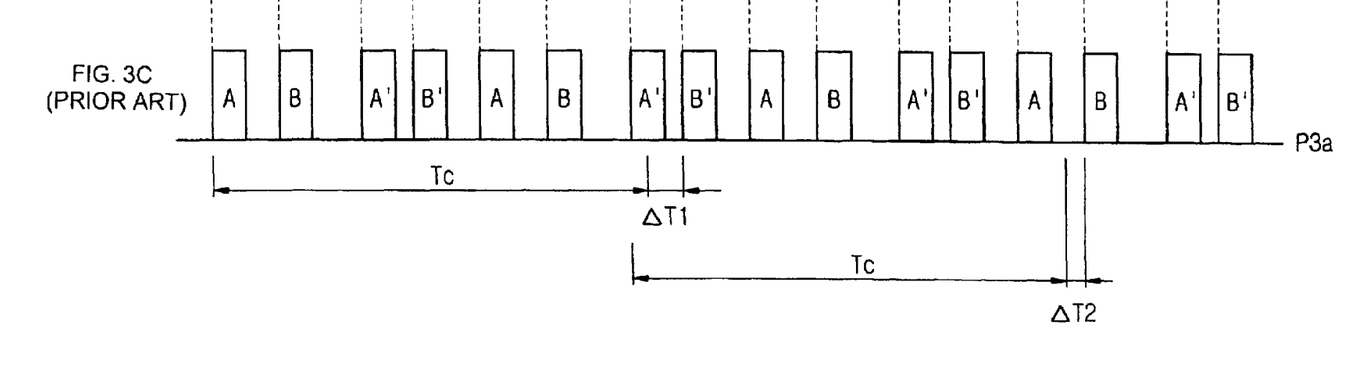

As shown in FIGS. 3A–3C, where a phase difference between a first pulse stream P1$a$ and a second pulse stream P2$a$ is not exactly 90°, a four-multiplied pulse stream P3$a$ cannot be constantly generated. Thus, an error can occur for the constant sampling period Tc. A remaining period ΔT1 in a case where the sampling period Tc starts from a pulse having a phase A is different from a remaining time ΔT2 in a case where the sampling period Tc starts from a pulse having a phase A'. Although a conventional motor drives at a same driving speed, a problem exists that a speed detection error occurs according to a sampling start point for a motor driving speed measurement.

Figure 4:
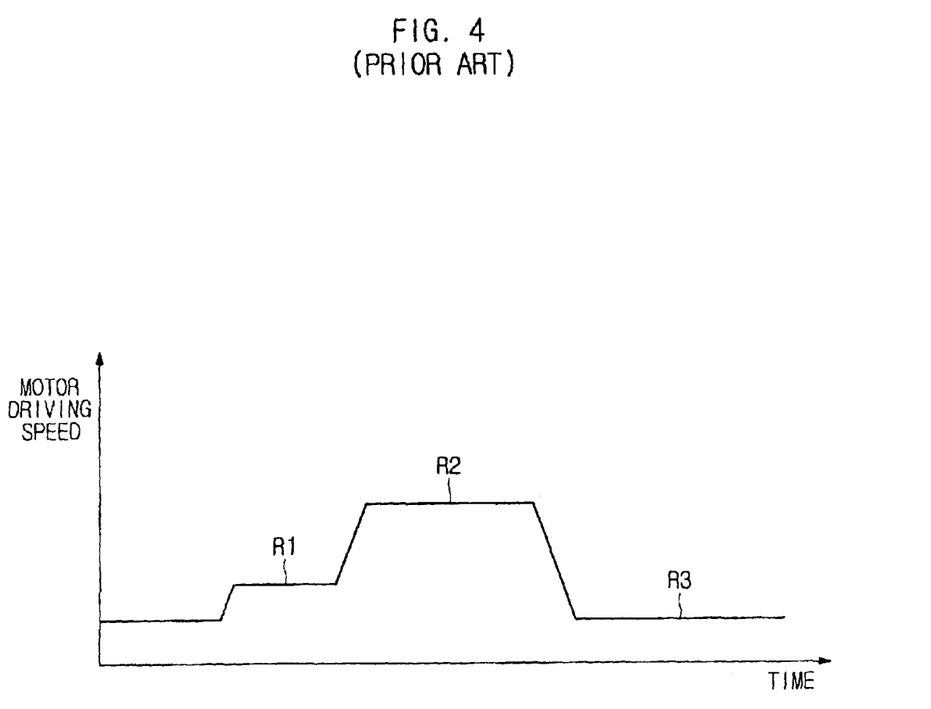
FIG. 4 is a graph illustrating a variation of a motor driving speed according to operating conditions.

Further, the motor driving speed conventionally varies while the motor performs a given work process. Referring to FIG. 4, a graph shows a case where the motor driving speed varies in a form of a sequence of R1→R2→R3 (R3<R1<R2) according to operating conditions. Thus, a result of a detection of the motor driving speed varies with the motor driving speed. Accordingly, a problem exists in that the driving speed of the conventional motor cannot be precisely and stably controlled.

If a phase difference between the two pulses is not proper because of, for example, a defect of the encoder, the result of the detection of the motor driving speed is not constant according to the sampling start point at the same speed. When the driving of the motor is controlled based on incorrect motor information, a motor control operation cannot be precisely performed and a response characteristic of the motor can deteriorate.

SUMMARY OF THE INVENTION

Therefore, it is an aspect of the present invention to provide an apparatus for controlling driving speed of a motor, which can precisely control a motor driving speed by adjusting a detection time for pulses outputted from an encoder.

Additional aspects and advantages of the invention will be set forth in part in the description which follows and, in part, will be obvious from the description, or may be learned by practice of the invention.

In accordance with the above and/or other aspects, an apparatus for controlling a driving speed of a motor, comprises: a motor; a motor driver to drive the motor at a predetermined driving speed; an encoder communicating with the motor driver, to output pulses; and a motor controller adjusting a detection time for the pulses received from the encoder to measure the motor driving speed.

BRIEF DESCRIPTION OF THE DRAWINGS

These and other aspects and advantages of the invention will become apparent and more readily appreciated from the following description of the preferred embodiments, taken in conjunction with the accompanying drawings of which.

DESCRIPTION OF THE PREFERRED EMBODIMENT

Reference will now be made in detail to the present preferred embodiment of the present invention, examples of which are illustrated in the accompanying drawings, wherein like reference numerals refer to like elements throughout.

Figure 5:
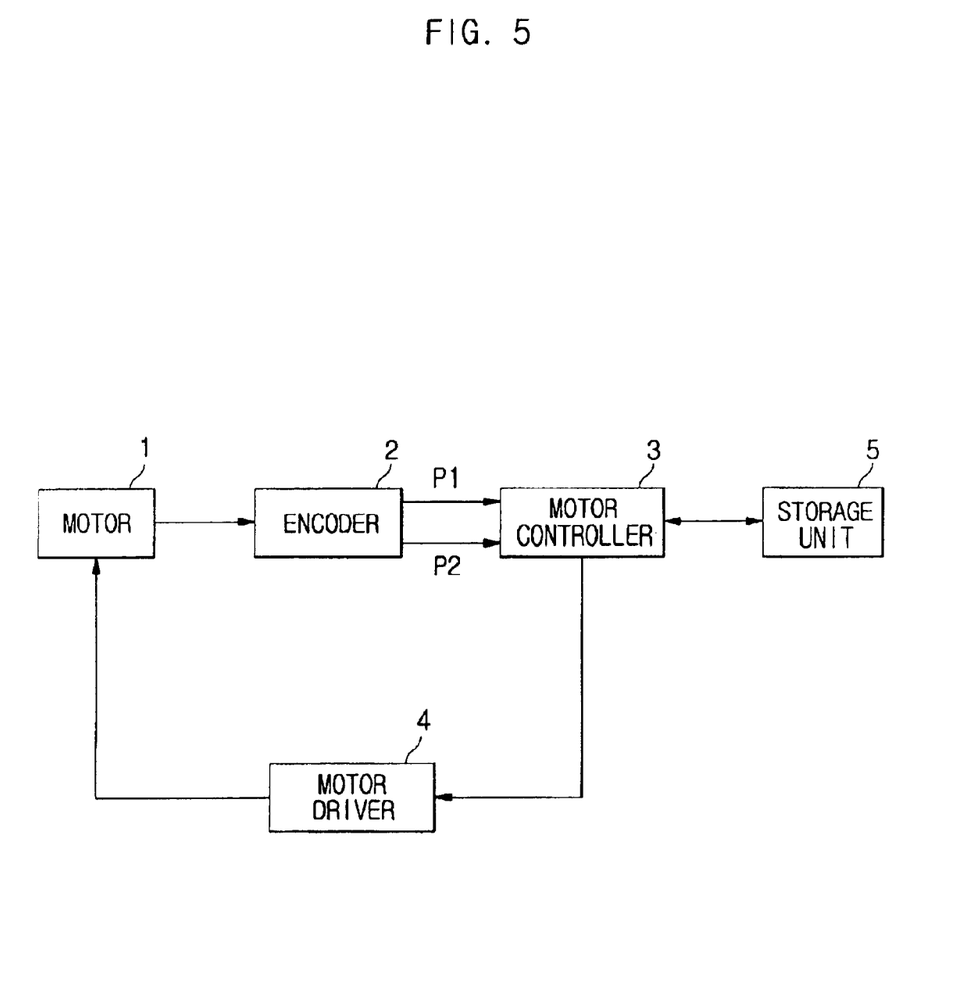
FIG. 5 is a block diagram illustrating an apparatus for controlling a driving speed of a motor in accordance with an embodiment of the present invention.

FIG. 5 is a block diagram illustrating an apparatus for controlling a driving speed of a motor in accordance with an embodiment of the present invention.

The apparatus for controlling the motor driving speed comprises an encoder 2 provided in a motor 1, a motor controller 3 receiving pulses from the encoder 2 and outputting a control signal to control a driving of the motor 1, and a motor driver 4 driving the motor 1 in response to the control signal from the motor controller 3.

The motor controller 3 receives two pulses from the encoder 2 and measures a motor driving speed in response to the two pulses. Further, the motor controller 3 outputs the control signal so that the measured motor driving speed can reach a desired motor driving speed.

A phase difference between the pulses from the encoder 2 is not exactly 90° because of inherent errors during a manufacture of the encoder 2. In order to exclude effects of the inherent errors, during the manufacture of the encoder 2, the motor controller 3 sets a sampling period corresponding to a multiple of four of the pulses outputted from the encoder 2.

The storage unit 5 stores data of the sampling period corresponding to the multiple of four of the pulses from the encoder 2 based on a motor driving speed. The storage unit 5 provides the data of the sampling period corresponding to the motor driving speed to the motor controller 3 if the data of the sampling period for the motor driving speed is requested from the motor controller 3.

If the phase difference between the pulses from the encoder 2 is not 90° when the motor 1 is driven, intervals between four-multiplied pulse streams (A→B→A'→B'→A) are not constant. However, intervals between pulses (A→A, B→B, C→C and D→D) belonging to a same pulse stream are constant. In this case, if a sampling period is a multiple of four of the pulses, that is, the sampling period corresponds to the intervals between the pulses belonging to the same pulse stream, the motor driving speed can be exactly detected.

Figure 6:
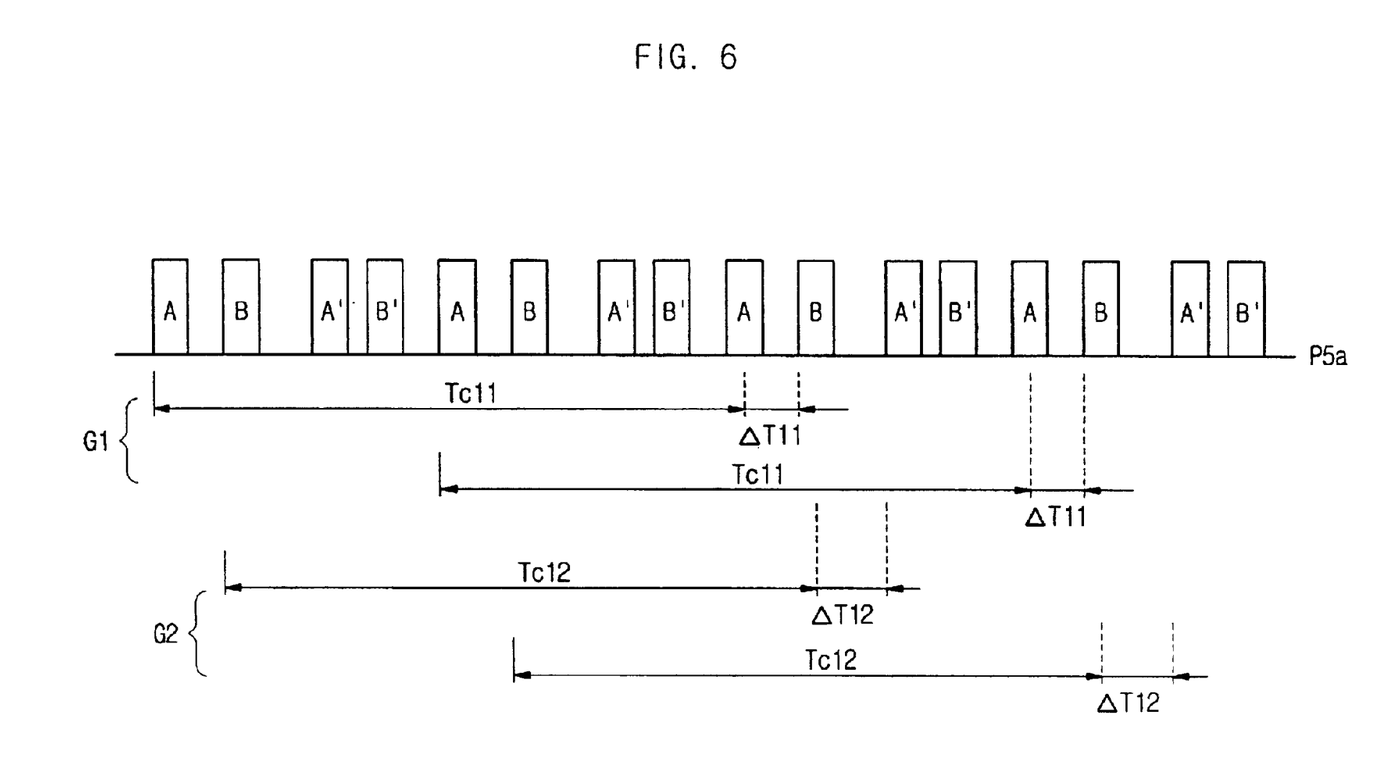
FIG. 6 is a view explaining an operation of setting a sampling period for a pulse stream generated when a motor is driven at a slow speed in accordance with the embodiment of the present invention.
Figure 7:
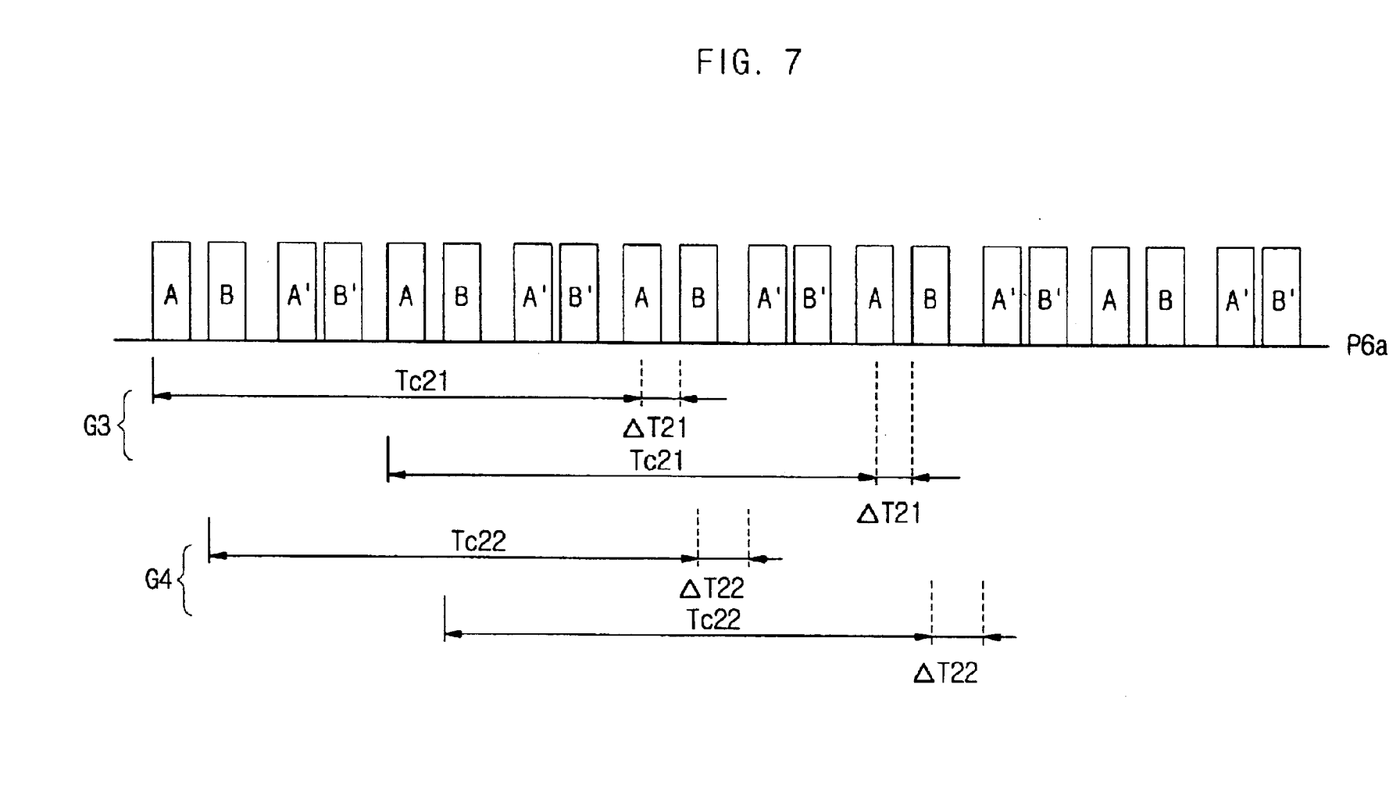
FIG. 7 is a view explaining an operation of setting a sampling period for a pulse stream generated when a motor is driven at a high speed in accordance with the embodiment of the present invention.

FIGS. 6 and 7 are views explaining operations of setting a sampling period for a four-multiplied pulse stream generated when a motor is driven at a slow speed and a high speed in accordance with the embodiment of the present invention.

In FIG. 6, a four-multiplied pulse stream P5a is generated in a slow-speed operating mode. A first group G1 includes a pulse A having a sampling start point and another pulse A having a sampling end point. In the first group G1, a number of four-multiplied pulses corresponding to a sampling period Tc11 is "8." Further, a second group G2 includes a pulse B having a sampling start point and another pulse B having a sampling end point. In the second group G2, a number of four-multiplied pulses corresponding to a sampling period Tc12 is "8."

Accordingly, where the motor driving speed corresponding to the first group G1 is measured, the sampling period Tc11 and a remaining period ΔT11 are constant in a series of pulses A. Similarly, where the motor driving speed corresponding to the second group G2 is measured, the sampling period Tc12 and a period of a remaining period ΔT12 are constant in a series of pulses B.

Although the motor driving speed varies with operating conditions, the motor controller 3 sets a sampling period so that the number of four-multiplied pulses can be a multiple of four. As shown in FIG. 7, a four-multiplied pulse stream P6a is generated from output pulses of the encoder 2. A third group G3 includes a pulse A having a sampling start point and another pulse A having a sampling end point. Further, a fourth group G4 includes a pulse B having a sampling start point and another pulse B having a sampling end point. In the third or fourth groups G3 or G4, the number of four-multiplied pulses corresponding to a sampling period Tc21 or Tc22, respectively, is "8." Accordingly, where a motor driving speed corresponding to the third group G3 is measured, the sampling period Tc21 and a remaining period ΔT21 are constant in a series of pulses A. Similarly, where a motor driving speed corresponding to the fourth group G4 is measured, the sampling period Tc22 and a remaining period ΔT22 are constant in a series of pulses B.

Where the motor driving speed varies with operating conditions, the storage unit 5 provides the data of the sampling period corresponding to the varied motor driving speed toward the motor controller 3 after receiving a request for the data of the sampling period corresponding to the varied motor driving speed from the motor controller 3. Accordingly, the motor controller 3 can measure the motor driving speed based on a corresponding sampling period. For example, the storage unit stores the data on previous driving speeds of the motor for comparison to the current driving speed of the motor.

Further, the motor controller 3 can set the sampling period corresponding to the varied motor driving speed by increasing the sampling period. Without receiving the data of the sampling period corresponding to the varied motor driving speed from the storage unit 5, the motor controller 3 sets the sampling period by itself so that the sampling period corresponds to the multiple of four of the pulses outputted from the encoder 2.

For a total detection period Td (=Tc+ΔT), the motor controller 3 increases a sampling period Tc by a time value "a" where the number of four-multiplied pulses m1 is a value of 4k−1 (k is a positive integer). Further, the motor controller 3 decreases a sampling period Tc by a time value "a" where the number of four-multiplied pulses m1 is a value of 4k+1 (k is a positive integer). Furthermore, the motor controller 3 increases a sampling period Tc by a time value "2a" where the number of four-multiplied pulses m1 is a value of 4k−2 (k is a positive integer). As described above, the motor controller 3 sets the sampling period based on a multiple of four so that a same driving speed of the motor is constantly detected when the motor is driven at the same driving speed.

Where the apparatus for controlling the motor driving speed includes the storage unit 5, the motor controlling apparatus can quickly operate against a variation of the motor driving speed. Further, where the motor controller 3 sets the sampling period by itself, the motor controller 3 can exactly set the sampling period in response to many motor driving speed variations.

As is apparent from the above-description, an apparatus for controlling a driving speed of a motor is provided, which can precisely detect the motor driving speed and control the driving of the motor and therefore obtain a desired response characteristic, although a phase difference between pulses outputted from an encoder is not constant because of a phase error generated during the manufacture of the encoder.

Although a preferred embodiment of the present invention has been shown and described, it would be appreciated by those skilled in the art that changes may be made in these embodiments without departing from the principles and spirit of the invention, the scope of which is defined in the claims and their equivalents.

What is claimed is:

1. An apparatus for controlling a driving speed of a motor, comprising:
    a motor driver driving the motor at a predetermined driving speed;
    an encoder, communicating with the motor driver, to output pulses; and
    a motor controller to adjust a detection period for the pulses received from the encoder to measure the motor driving speed, when the pulses include at least two pulses having a phase difference, by counting each of the two pulses in a set of a predetermined number of pulses, and then setting the detection period so that a number of the pulses, which are counted in sets of the predetermined number of pulses, is a multiple of the predetermined number of pulses.

2. An apparatus for controlling a driving speed of a motor, comprising:
    a motor driver driving the motor at a predetermined driving speed;
    an encoder, communicating with the motor driver, to output pulses; and
    a motor controller adjusting a detection period for the pulses received from the encoder to measure the motor driving speed, wherein the motor controller multiplies two pulses by four when the encoder outputs the two pulses having a phase difference and the motor controller sets the detection period so that a number of four-multiplied pulses is a multiple of four.

3. The apparatus as set forth in claim 1, wherein the motor controller adjusts the detection period in response to a varied motor driving speed where the motor driving speed varies with operating conditions.

4. The apparatus as set forth in claim 3, wherein the motor controller sets the detection period corresponding to the varied motor driving speed by increasing the detection period.

5. The apparatus as set forth in claim 3, further comprising:
    a storage unit storing data of the detection period corresponding to a motor driving speed,
    the motor controller receiving the data of the detection period corresponding to the motor driving speed from the storage unit.

6. The apparatus as set forth in claim 3, further comprising:
    a storage unit storing data of the detection period corresponding to a motor driving speed, the motor controller receiving the data of the detection period corresponding to the motor driving speed from the storage unit.

7. An apparatus for controlling a driving speed of a motor, comprising:
    a motor driver;
    a motor controller controlling the motor driver; and
    an encoder to output pulses to the motor controller, the motor controller measuring the drive speed of the motor by adjusting a detection period of the pulses received from the encoder, when the pulses include at least two pulses having a phase difference, by counting each of the two pulses in sets of a predetermined number of pulses and then setting the detection period so that a number of the pulses, which are counted in sets of the predetermined number of pulses, is a multiple of the predetermined number of pulses, the motor driver driving the motor according to the measured drive speed of the motor.

8. The apparatus as set forth in claim 7, wherein the detection period is increased by a predetermined interval.

9. The apparatus as set forth in claim 7, wherein the detection period is decreased by a predetermined interval.

10. The apparatus as set forth in claim 7, wherein the motor controller adjusts the detection period in response to a changed motor driving speed when the motor driving speed is changed.

11. An apparatus for controlling a driving speed of a motor, comprising:
    a motor driver driving the motor at a predetermined driving speed;
    an encoder, communicating with the motor driver, to output pulses; and
    a motor controller adjusting a detection period for the pulses received from the encoder to measure the motor driving speed, wherein:
        the encoder outputs two pulse streams having a phase difference such that the motor controller generates a four-multiplied pulse stream from the two pulses streams, and
        the motor controller sets the detection period such that a number of four-multiplied pulses in the four-multiplied pulse stream in the detection period is a multiple of four.

12. The apparatus as set forth in claim 11, wherein the motor controller adjusts the detection period in response to a changed motor driving speed when the motor driving speed is changed.

13. The apparatus as set forth in claim 12, wherein the motor controller sets the detection period corresponding to the changed motor driving speed by increasing the detection period when the number of four-multiplied pulses in the detection period is equal to 4k−1, where k is a positive number.

14. The apparatus as set forth in claim 12, wherein the motor controller sets the detection period corresponding to the changed motor driving speed by decreasing the detection period when the number of four-multiplied pulses in the detection period is equal to 4k+1, where k is a positive number.

15. The apparatus as set forth in claim 12, wherein the motor controller sets the detection period corresponding to the changed motor driving speed by decreasing the detection period by a first predetermined interval when the number of four-multiplied pulses in the detection period is equal to 4k+1, and by decreasing the detection period by a second predetermined interval when the number of four-multiplied pulses in the detection period is equal to 4k−2.

16. The apparatus as set forth in claim 15, wherein the second predetermined interval is twice the period of the first predetermined interval.

17. A method of controlling a driving speed of a motor, comprising:
   outputting pulses according to the driving speed of the motor;
   adjusting a detection period of the outputted pulses, when the pulses include at least two pulses having a phase difference, by:
      counting each of the two pulses in sets of a predetermined number of pulses, and
      setting the detection period so that a number of the pulses, which are counted in sets of the predetermined number of pulses, is a multiple of the predetermined number of pulses;
   measuring the motor driving speed of the motor from the detected pulses; and
   driving the motor according to the measured driving speed of the motor.

18. The method as set forth in claim 17, further comprising:
   varying the driving speed of the motor according to operating conditions, wherein the adjusting of the detection period is in response to the varied driving speed of the motor.

19. The method as set forth in claim 17, wherein the adjusting of the detection period comprises:
   increasing the detection period.

20. The method as set forth in claim 18, further comprising:
   storing data of the detection period, as operating conditions of the motor vary, corresponding to one or more driving speeds of the motor; and
   adjusting the detection period based on the stored data of the detection period corresponding to one or more driving speeds of the motor.

21. The method as set forth in claim 18, wherein the adjusting of the detection period comprises:
   increasing the detection period.

22. The method as set forth in claim 18, wherein the adjusting of the detection period comprises:
   decreasing the detection period.

23. The method as set forth in claim 17, further comprising:
   storing data of the detection period corresponding to a motor driving speed; and
   adjusting the detection period based on the stored data.

24. A method of controlling a driving speed of a motor, comprising:
   outputting pulses according to the driving speed of the motor;
   adjusting a detection period of the outputted pulses;
   measuring the motor driving speed of the motor from the detected pulses; and
   driving the motor according to the measured driving speed of the motor, wherein the adjusting of the detection period comprises:
      multiplying two pulses by four when the encoder outputs the two pulses having a phase difference; and
      setting the detection period such that a number of the four-multiplied pulses is a multiple of four.

25. A method of controlling a driving speed of a motor, comprising:
   outputting pulses according to the driving speed of the motor;
   adjusting a detection period of the outputted pulses;
   measuring the motor driving speed of the motor from the detected pulses; and
   driving the motor according to the measured driving speed of the motor, wherein:
      the outputting of the pulses comprises:
         outputting two pulse streams having a phase difference and generating a four-multiplied pulse stream from the two outputted pulses streams; and the adjusting of the detection period comprises:
         setting the detection period such that a number of four-multiplied pulses in the four-multiplied pulse stream is a multiple of four.

26. The method as set forth in claim 25, wherein the setting of the detection period comprises:
   increasing the detection period when the number of four-multiplied pulses in the detection period is equal to 4k−1, where k is a positive number.

27. The method as set forth in claim 25, wherein the setting of the detection period comprises:
   decreasing the detection period when the number of four-multiplied pulses in the detection period is equal to 4k+1, where k is a positive number.

28. The method as set forth in claim 25, wherein the setting of the detection period comprises:
   decreasing the detection period by a first predetermined interval when the number of four-multiplied pulses in the detection period is equal to 4k+1, where k is a positive number; and
   decreasing the detection period by a second predetermined interval when the number of four-multiplied pulses in the detection period is equal to 4k−2, where k is a positive number.

29. The method as set forth in claim 28, wherein the second predetermined interval is twice the period of the first predetermined interval.

* * * * *